United States Patent [19]

Kawaguchi et al.

[11] 3,901,877

[45] Aug. 26, 1975

[54] OXAMICETIN AND PROCESS FOR ITS PRODUCTION

[75] Inventors: Hiroshi Kawaguchi, Tokyo; Masataka Konishi, Yokohama; Koji Tomita, Kawasaki, all of Japan

[73] Assignee: Bristol-Myers Company, New York, N.Y.

[22] Filed: Feb. 28, 1974

[21] Appl. No.: 446,846

Related U.S. Application Data

[63] Continuation of Ser. No. 265,402, June 22, 1972, Pat. No. 3,843,449.

[52] U.S. Cl.... 260/211.5 AB; 195/96; 260/210 AB; 260/211 R; 260/211.5 R
[51] Int. Cl.$^2$........................................ C07H 19/06
[58] Field of Search.... 260/210 AB, 211.5 R, 210 R

[56] References Cited
OTHER PUBLICATIONS

Stanek et al., "The Monosaccharides," Academic Press, Inc., New York, N.Y., 1963, pp. 471–472.

*Primary Examiner*—Johnnie R. Brown
*Attorney, Agent, or Firm*—James Magee, Jr.

[57] ABSTRACT

The specification discloses a new chemical substance designated as oxamicetin and a process for preparing the substance by cultivation of a strain of Arthrobacter named *Arthrobacter oxamicetus*. Oxamicetus has been shown to have antibiotic activity against both Gram-positive and Gram-negative organisms.

1 Claim, No Drawings

OXAMICETIN AND PROCESS FOR ITS PRODUCTION

This is a continuation of application Ser. No. 265,402, filed June 22, 1972, now U.S. Pat. No. 3,843,449.

BACKGROUND OF THE INVENTION

This invention is directed to a heretofore unknown chemical substance, hereafter referred to as oxamicetin, and to a process for preparing oxamicetin by fermentation of a new species of the Genus Arthrobacter designated as *Arthrobacter oxamicetus*. This organism was isolated from a soil sample collected at Kominato, Chiba, Japan. A culture of the organism has been deposited with the American Type Culture Collection, Rockville, Maryland, as ATCC 21788.

Oxamicetin, which has the structure,

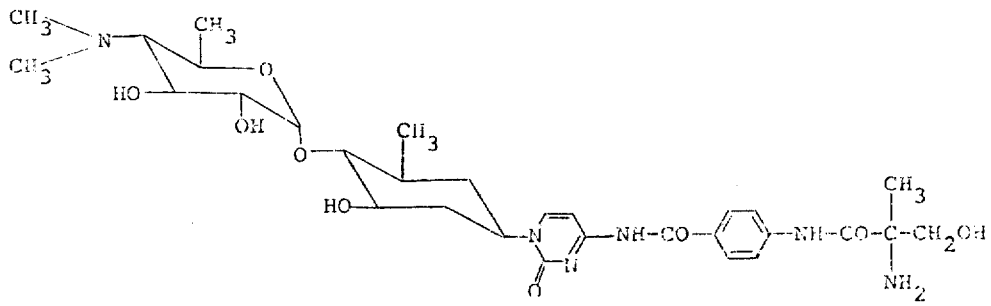

is a basic antibiotic which can be crystallized as its hydrochloride hydrate. Elemental analysis and titration data have been found to be consistent with a molecular formula of $C_{29}H_{42}N_6O_{10}$ for the free base. This formula contains one oxygen atom in excess of the amicetin molecule reported by De Boer et al. in J. Am. Chem. Soc., 75:499 (1953). Oxamicetin contains 3-hydroxyamicetose (D-chromose C or olivose) in place of amicetose found in the structure of amicetin.

The compound described above is produced by cultivating an oxamicetin-producing strain of Arthrobacter in an aqueous carbohydrate medium containing a nitrogenous nutrient under submerged aerobic conditions. The antibiotic compound can be recovered from the fermentation broth by the usual methods including organic solvent extraction.

The infrared spectrum shown in FIG. 1 of the attached drawing shows absorptions due to hydroxy group (3300 cm$^{-1}$), amide carbonyls (1690, 1640) and conjugated C=C bond (1600 cm$^{-1}$). The compound gave positive ninhydrin, Dragendorff and anthrone reactions but is negative to Fehling and Tollen's reagents, indicating the absence of reactive reducing sugar moieties. The NMR spectrum of oxamicetin hydrochloride in deuterium oxide shows three C—CH$_3$, i.e., two doublets centered at δ1.44 and 1.55 ppm, and one singlet at δ 1.78 ppm, and one dimethylamino group at δ 3.09 ppm. The characteristic two vinyl protons appeared as doublets at δ 7.32 and 8.09 ppm and four aromatic protons as an AB quartet centered at δ 7.69 ppm. In addition, two anomeric protons are observed at δ 5.32 (doublet, J : 3.5Hz) and 5.70 ppm (broad doublet, J = 10.5 Hz). These NMR data reflect the close structural similarity of this antibiotic to amicetin. The chemical shift of the signal clearly distinquishes oxamicetin from amicetin.

Oxamicetin-free base is readily soluble in acidic water, methanol, ethanol and n-butanol, slightly soluble in neutral and alkaline water, but practically insoluble in acetone, ethyl acetate, ether and other common organic solvents.

Crystalline oxamicetin hydrochloride melts at 205° C. to 210° C. with decomposition. Potentiometric titration of the hydrochloride in 50% aqueous ethanol showed the presence of three titrable groups in the molecule; one acidic group with a pKa' of 11.2 and two basic groups with the same pKa' value of 6.70, the titration equivalent being 748. Analysis corresponds to the emperical formula: $C_{29}H_{42}N_6O_{10}\cdot 2HCL\cdot 2H_2O$ (MW 743.6).

Calc'd.: C 46.84, H 6.51, N 11.30.

Found: C 47.22, H 6.58, N 11.29.

Optical rotation of oxamicetin hydrochloride is: $[\alpha]_D^{25} = +66°$ (c 0.4, water). The ultraviolet absorption spectrum is shown in FIG. 1. The absorption maxima are observed at 305 mμ (ε : 31,700) in water, 316 mμ (ε : 26,600) in 0.1N HCl and 322 mμ (ε : 21,900) in 0.1N NaOH. The infrared spectrum of oxamicetin hydrochloride in KBr pellet is shown in FIG. 2, which suggested a close resemblance to that of amicetin.

Oxamicetin gives the following Rf values on silicagel TLC detected by bio-autography with B. subtilis or by spraying with anthrone reagent: 0.25 (n—BuOH—AcOh—H$_2$O, 3:1:1), 0.72 (EtOH — 28% NH$_4$OH — H$_2$O, 8:1:1). Alumina TLC developed with 80% methanol was found suitable to differentiate oxamicetin (Rf : 0.54) from amicetin (Rf : 0.61).

The minimum inhibitory concentration (MIC) of oxamicetin was determined by the serial agar dilution method. The results are shown in Table I, below, along with those obtained with amicetin which was used as a reference.

Oxamicetin exhibits similar antibacterial spectrum to that of amicetin. It is somewhat more active than amicetin against Gram-negative bacteria, but less active than the latter against Gram-positive and acid-fast bacteria.

The in vivo activity of oxamicetin was assessed by the experimental infection in mice against two pathogenic bacteria, S. aureus Smith and E. coli NIHJ. Mice were inoculated intraperitoneally with a 100xLD$_{50}$ dose of the pathogen and oxamicetin was administered subcutaneously just after the bacterial challenge. Oxamicetin protected mice from the infection, giving subcutaneous CD$_{50}$ of 100 mg./kg. against S. aureus Smith and 120 mg./kg. against E. coli NIHJ. No in vivo activity was seen when the antibiotic was given orally.

The acute toxicity of oxamicetin was determined in mice, the intravenous LD$_{50}$ being 200 mg./kg. It was nontoxic at 400 mg./kg. when given subcutaneously.

TABLE I

| TEST ORGANISMS | TEST MEDIUM[1] | MIC (mcg./ml.) OXAMICETIN | AMICETIN |
|---|---|---|---|
| Escherichia coli NIHJ | A | 25 | 50 |
| Escherichia coli Juhl | A | 100 | >100 |
| Escherichia coli A15169 | A | 6.3 | 6.3 |
| Escherichia coli A20365 | A | 6.3 | 12.5 |
| Klebsiella pneumoniae D11 | A | 50 | 100 |
| Proteus vulgaris A9436 | A | 50 | 50 |
| Proteus vulgaris A9526 | A | 25 | 25 |
| Proteus morganii A20031 | A | 50 | >100 |
| Proteus mirabilis A9554 | A | >100 | >100 |
| Shigella flexneri A9684 | A | 100 | 100 |
| Shigella sonnei Yale | A | 50 | 100 |
| Salmonella enteritidis A9531 | A | 3.1 | 3.1 |
| Salmonella typhosa Yale | A | 50 | 100 |
| Pseudomonus aeruginosa D15 | A | >100 | >100 |
| Staphylococcus aureus Smith | A | 12.5 | 6.3 |
| Staphylococcus aureus 93 | A | 12.5 | 6.3 |
| Staphylococcus aureus Russell | A | 12.5 | 6.3 |
| Staphylococcus aureus Terajima | A | 1.6 | 0.8 |
| Streptococcus pyogenes S-23 | B | 6.3 | 3.1 |
| Streptococcus pyogenes Dick | B | 100 | 50 |
| Streptococcus pyogenes Digonnet | B | 25 | 6.3 |
| Diplococcus pneumoniae Type 2 | B | 25 | 3.1 |
| Sarcina lutea PCI | A | 1.6 | 1.6 |
| Micrococcus flavus | A | 1.6 | 3.1 |
| Bacillus subtilis PCI-219 | A | 6.3 | 12.5 |
| Bacillus anthracis 115 | A | 25 | 12.5 |
| Mycobacterium 607 | C | 12.5 | 3.1 |
| Mycobacterium 607 | C | 12.5 | 3.1 |
| Mycobacterium 607 | C | 3.1 | 1.6 |
| Mycobacterium phlei | C | 3.1 | 0.8 |
| Mycobacterium ranae | C | 12.5 | 3.1 |

[1]A: neutrient agar.
B: blood agar.
C: 3% glycerol, 0.3% sodium L-glutamate, 0.2% peptone, 0.31% $Na_2HPO_4$, 0.1% $KH_2PO_4$, 0.005% ammonium citrate, 0.001% $MgSO_4$, 1.5% agar.

The organism used in the production of oxamicetin was found to grow well at 20° C. to 30° C. on agar slants. Such slants were then used to prepare seed cultures by innoculation of a liquid vegetative medium containing about 2% glycerol, about 1% Pharmamedia, about 1% corn steep liquor, about 0.3% ammonium sulfate, about 0.4% calcium carbonate and about 0.003% hydrated zinc sulfate ($zuSO_4.7H_2O$). The seed culture was incubated at about 28° C. for 2 days on a rotary shaker running at 250 rpm. About 2 ml. of the seed culture was used to start a fermentation by transfer to 100 ml. of fermentation medium in a half liter Erlenmeyer flask. The composition of the fermentation medium was the same as that of the seed culture. Progress of the fermentation was followed by paper disc-agar diffusion assay using Bacillus subtilis PCI219 as a test organism. Antibiotic production in shaken flasks has been observed on the second day giving a potency of about 180 mcg. per ml. at a pH of about 6.9. A maximum potency of about 250 mcg. per ml. was reached on the third day (pH 7.7).

Oxamicetin has been produced by fermentation in 10 liter jar fermentors and in 100 liter pilot plant tanks using the above-described medium. In general, peak potency of about 200 mcg. per ml. was obtained in about 50 to 60 hours.

The fermentation broth (50L) was filtered at pH 3, and the filtrate was extracted at pH 8.2 to 8.4 with about one-third volume of n-butanol (15L). The extract was stirred with 5L of acidic water, the pH being adjusted to 2.0 by dilute hydrochloric acid. The active aqueous extract was then made alkaline (pH 8.2 to 8.4) and extracted again with 3L of n-butanol. The butanol extract was washed by water, concentrated in vacuo and then lyophilized to give about 6 g. of yellowish powder (potency: ca 500 mcg./mg.). Alumina thin-layer chromatography (TLC) developed by 80% methanol indicated a presence of slower moving impurity in the crude preparation.

Further purification was effectively accomplished by alumina column chromatography. Crude oxamicetin (3 g.) was dissolved in 50 ml. of 0.5N methanolic hydrogen chloride, and the solution was applied on a column of acid-treated alumina, the column being eluted fractionally by methanol. The active fractions were combined and concentrated in vacuo to dryness to afford 1.2 g. of oxamicetin hydrochloride with 90 to 95% purity. The solid was dissolved in a small amount of water containing a drop of hydrochloric acid and the solution was added with acetone to a cloudy point. Overnight storage of the solution in the cold gave colorless needle-like crystals of oxamicetin hydrochloride.

*Arthrobacter oxamicetus*, ATCC 21788, is a non-sporulating, non-motile bacterium and the cells show morphological changes during the growth, and these features are characteristic of the Family Corynebacteriaceae.

For the following characterization of this organism, the procedures described by Skerman, Wiley-Interscience, 1969; Gibbs et al., The Society for Applied Bacteriology, Technical Series 1, 1966; Gibbs et al., The Society for Applied Bacteriology, Technical Series 2, 1968; were followed. For the taxonomic identification of the organism, the descriptions by Conn et al., J. Bacteriol. 54: 291-303 (1947); Nigel et al., J. Bacteriol. 90(4): 921-927 (1965); and Cummins et al., Nature 184: 831-832 (1959) were used.

Morphological Characteristics

A conspicuous characteristic of this organism is a pleomorphism of the cells in size and shape during the course of growth (Plates 1 & 2). Young cells (12 to 24 hours) are Gram-variable (generally positive) rods of several lengths with irregular shapes, being straight, bent, curved, filamentous, and occasionally with a rudimentary branch. These rods develop, after 32 hours or later, into Gram-positive cocci of various forms. They may be single, paired or chained cocci, and the chains are straight, curved and zigzag.

Size of the cells ranges 0.5 to 0.8 × 0.6 to 4.0 microns. The organism is non-sporulating and non-motile and the acid-fast stain reaction (Ziehl-Neelsen) is negative.

*Arthrobacter oxamicetus* developed into two forms on the YGA-agar plate (glucose asparagine agar + 0.05% yeast extract), a compact type and a diffuse type.

Compact type of YGA agar colonies: Small, 0.3 to 1.0 mm. in diameter (3rd days). Compact, raised, convex and circular. Smooth, rigid and dull. Opaque, whitish to cream-colored, later light-pink orange. No soluble pigment.

Diffuse type of YGA agar colonies: Larger than compact type, 0.7 to 2.0 mm. (3rd days). Diffused, circular and less raised. Smooth, soft and glistening. Opaque, cream-colored, later light-pink orange. No soluble pigment.

YGA agar slant: Abundant growth. Smooth, soft, opaque, cream-colored, later light-pink orange. Not viscous. No soluble pigment.

Nutrient agar slant: Abundant growth. Aged cell not colored. Others same as YGA agar.

Nutrient broth: Light turbidity with sediment. No surface growth. No pigmentation.

Growth temperature: Scant or no growth at 37° C. Restricted growth at 32° C. to 35° C. Good growth at 20° C. to 30° C.

Oxygen demand: Obligately aerobic.

NaCl broth: No growth at 8%-NaCl. Restricted growth at 4 to 6% NaCl. Good growth at 0.5 to 3% NaCl.

Milk: Pale-orange ring-growth at surface. Sediment turns to pale-orange after 2 to 3 weeks. Slowly coagulated without peptonization.

Growth factor: none.

The results of the physiological reactions and the carbohydrate utilization test on strain ATCC 21788 are shown in Table II and Table III, below, respectively.

TABLE II

PHYSIOLOGICAL REACTIONS OF STRAIN ATCC 21788

| Test | Response | Method and Medium Employed |
|---|---|---|
| Survival test at 72° C. | Not survived | 10 minutes in milk |
| Decomposition of cellulose | Negative | Inorganic salts plus 0.05% yeast extract |
| Utilization of ammonium salts as a sole nitrogen source | Positive | Inorganic salts plus 1% sugar |
| Utilization of citrate as a sole carbon source | Positive | Simmons' citrate agar |
| Pigment from nicotine | Negative (no growth) | Nicotine agar (Sguros, 1955) |
| Starch hydrolysis | Negative | Hayward's starch agar |
| Nitrite from nitrate | Negative | Peptone broth plus 0.1% $KNO_3$ |
| Gelatin liquefaction | Negative | Peptone broth plus 25% gelatin (Skerman, 1967) |
| Milk peptonization | Negative | Incubation at 22° C. for 3 weeks |
| Milk coagulation | Positive (Slowly coagulated) | Incubation at 22° C. for 3 weeks |
| Change of pH in milk | Slightly acidified | Incubation at 22° C. for three weeks. |
| Indole production | Negative | Peptone broth (Kovacs' reagent) |
| Voges-Proskauer reaction | Negative | Peptone broth plus 1% glucose |
| $H_2S$ production from cysteine and thiosulfate | Negative | Skerman's (1967) method, and lead acetate agar |
| Gas from carbohydrate | Negative | Glucose, sucrose and mannitol as carbohydrate |
| Urease reaction | Positive | Christensen's urea medium |
| Catalase reaction | Positive | Hydrogen-peroxide solution |
| Oxidase reaction | Negative | Reaction of p-aminodimethyl-aniline oxalate (Kovacs' oxidase reagent) |
| Oxidative vs. fermentative metabolism of carbohydrate | Oxidative or no acid | Sucrose and mannitol as carbohydrate (Hugh & Leifson, 1953) |

TABLE III

CARBOHYDRATE UTILIZATION OF STRAIN ATCC 21788

| Glycerol | + | Maltose | − |
|---|---|---|---|
| L-Arabinose | − | Raffinose | − |
| D-Xylose | − | Inositol | − |
| Rhamnose | − | D-Mannitol | + |
| D-Fructose | + | D-Sorbitol | + |
| D-Galactose | − | Dulcitol | − |
| D-Glucose | + | Starch | − |
| D-Mannose | − | Cellulose | − |
| Sucrose | + | Inuline | − |
| Lactose | − | Salicine | − |

Taxonomy

In the 7th Edition of "Bergey's Manual of Determinative Bacteriology" (1957), six genera of Family Corynebacteriaceae are described (pages 578–612), among which three genera of Corynebacterium, Listeria and Erysipelothrix are clearly differentiated from *Arthrobacter oxamicetus*. Furthermore, Genus Microbacterium is thermoduric (at 72° C.) and Genus Cellulomonas decomposes cellulose, and therefore these two genera are also different from the present organism. Genus Arthrobacter is a soil organism, does not decompose cellulose, and the cells are pleomorphic and generally non-motile. These properties accord with those of *Arthrobacter oxamicetus* and, therefore, place it in the Genus Arthrobacter.

The organism utilizes nitrates or ammonium salts as a sole nitrogen source and citrates as a sole carbon source. Six species of Genus Arthrobacter having such abilities are described in Bergey's Manual, supra., and the organism was compared with these species. According to Bergey's key system, the organism gets close to *A. ureafaciens* but they are different in the *chromogenicity, growth temperature, urease activity, gelatin liquefaction and milk coagulation*.

Smeath et al., Interntl. J. System. Bacteriol. 16(1): 1–7 (1966), described five additional species of Arthrobacter as the type strains. They are *A. atrocyaneus, A. duodecadis, A. flavescens, A. nicotianae* and *A. ramosus*. *A. oxamicetus* differs from *A. flavescens* and *A. duodecadis* in the requirement of vitamin $B_{12}$ and terregens factor, from *A. atrocyaneus* in the blue-pigmentation, optimum growth temperature, urease activity and starch hydrolysis, from *A. nicotianae* in the pigmentation, and from *A. ramosus* in the gelatin liquefaction and chromogenicity.

*A. oxamicetus* was further compared with five Arthrobacter species including those appeared in the recent literatures. They are *A. crystallopoietes, A. polychromogenes, A. viscosus, A. marinus* and A. sp. NRRL-B3381 (erythromycinproducer) U.S. Pat. No. 3,551,294.

*A. viscosus* shares several common features with *A. oxamicetus* but differs from the latter in the lack of pigment on sugar media, the peptonization but no coagulation of milk, the nitrate reduction and the production of viscous polysaccharide.

Oxamicetin has properties which make it useful as an antibacterial agent, nutritional supplement in animal feeds, therapeutic agent in poultry and animals, including man. This compound is especially valuable in the treatment of infectious diseases caused by either Gram-positive or Gram-negative bacteria. Antibacterial compositions containing oxamicetin can be prepared by the usual pharmaceutical techniques and administered in accordance with accepted and standard medical practice.

What is claimed is:

1. The compound oxamicetin characterized by the structure

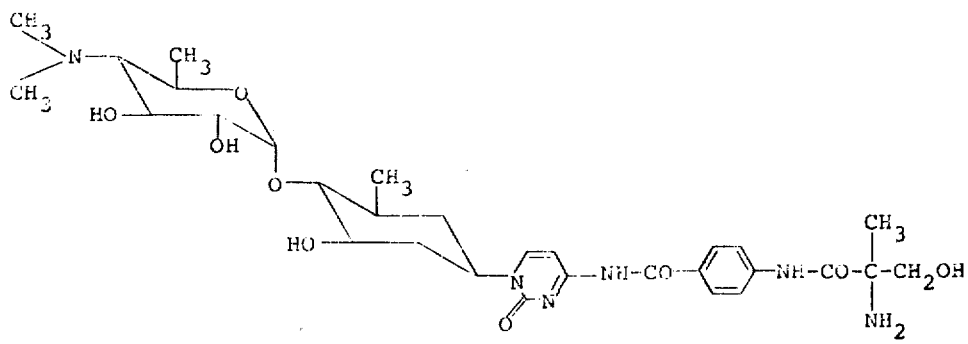

* * * * *